United States Patent [19]

Schulte et al.

[11] Patent Number: 5,203,736
[45] Date of Patent: Apr. 20, 1993

[54] METHOD FOR DEBONING POULTRY LEGS AND APPARATUS FOR PERFORMING THE METHOD

[75] Inventors: Josef Schulte, Hamberge; Günther Wodrich, Klempau, both of Fed. Rep. of Germany

[73] Assignee: Nordischer Maschinenbau Rud. Baader GmbH & Co. KG, Lubeck, Fed. Rep. of Germany

[21] Appl. No.: 852,814

[22] Filed: Mar. 17, 1992

[30] Foreign Application Priority Data

Mar. 23, 1991 [DE] Fed. Rep. of Germany ....... 4109699

[51] Int. Cl.⁵ .............................................. A22B 25/16
[52] U.S. Cl. ................................... 452/135; 452/136; 452/127
[58] Field of Search ............... 452/135, 136, 125, 127, 452/172, 170

[56] References Cited

U.S. PATENT DOCUMENTS 4,669,150  6/1987  Manmoto et al. ................. 452/136
5,067,927 11/1991  Hazenbroek et al. ............ 452/135
5,071,388 12/1991  Lendert et al. .................... 452/170

FOREIGN PATENT DOCUMENTS

EP0402647 12/1990 European Pat. Off. .
3227430 1/1984 Fed. Rep. of Germany .

Primary Examiner—Willis Little
Attorney, Agent, or Firm—Fay, Sharpe, Beall, Fagan, Minnich & McKee

[57] ABSTRACT

A method for obtaining leg meat from poultry drumsticks and an apparatus for performing the method are described. Deriving from an apparatus by which, following the performance of an encircling cut in the region of the distal condyle (41) and the consequent severing of the tendons, skins and ligaments of the drumstick bone (44) under retention of the leg meat is pulled by means of a strip-off diaphraghm, an apparatus is described by which a pair of gripping elements (17 and 18) are provided, which can be brought into a position for gripping around the drumstick bone (44) and each of which is respectively provided with a recess (20) in this embracing region, which can be aligned laterally displaced with regard to the position of the drumstick bone (44), and by which apparatus a severing device (16) is integrated with the gripping elements (17 and 18), the cutting mechanism of which is effective immediately next to the recess (20). The object is to guide a severing cut which leaves the tendons (47) constituting the continuation of the splint bone toward the distal end uncut/intact with the effect that the splint bone is also pulled along with the drumstick bone (44).

10 Claims, 2 Drawing Sheets

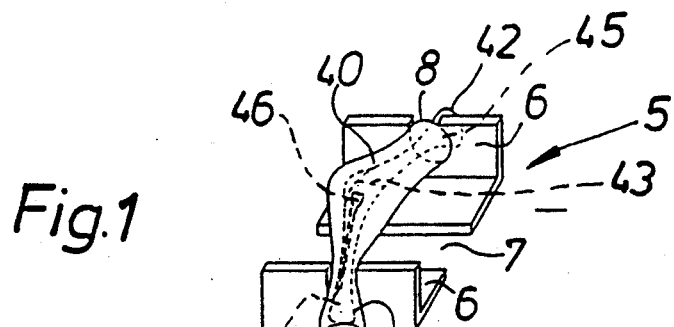
Fig.1
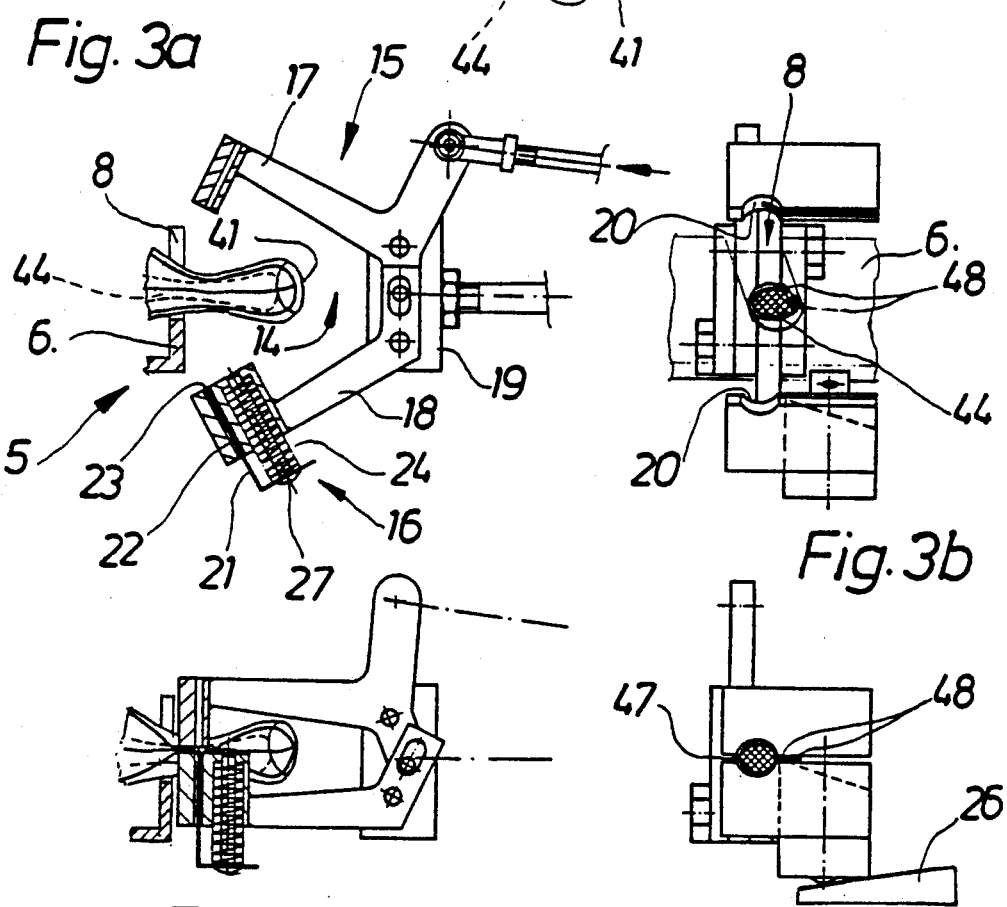
Fig.3a  Fig.3b
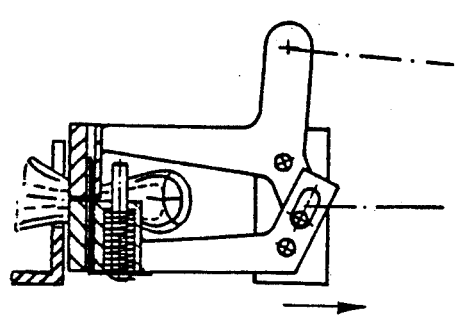
Fig.4a
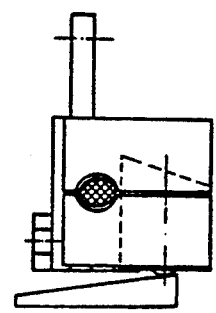
Fig.4b
Fig.5a  Fig.5b

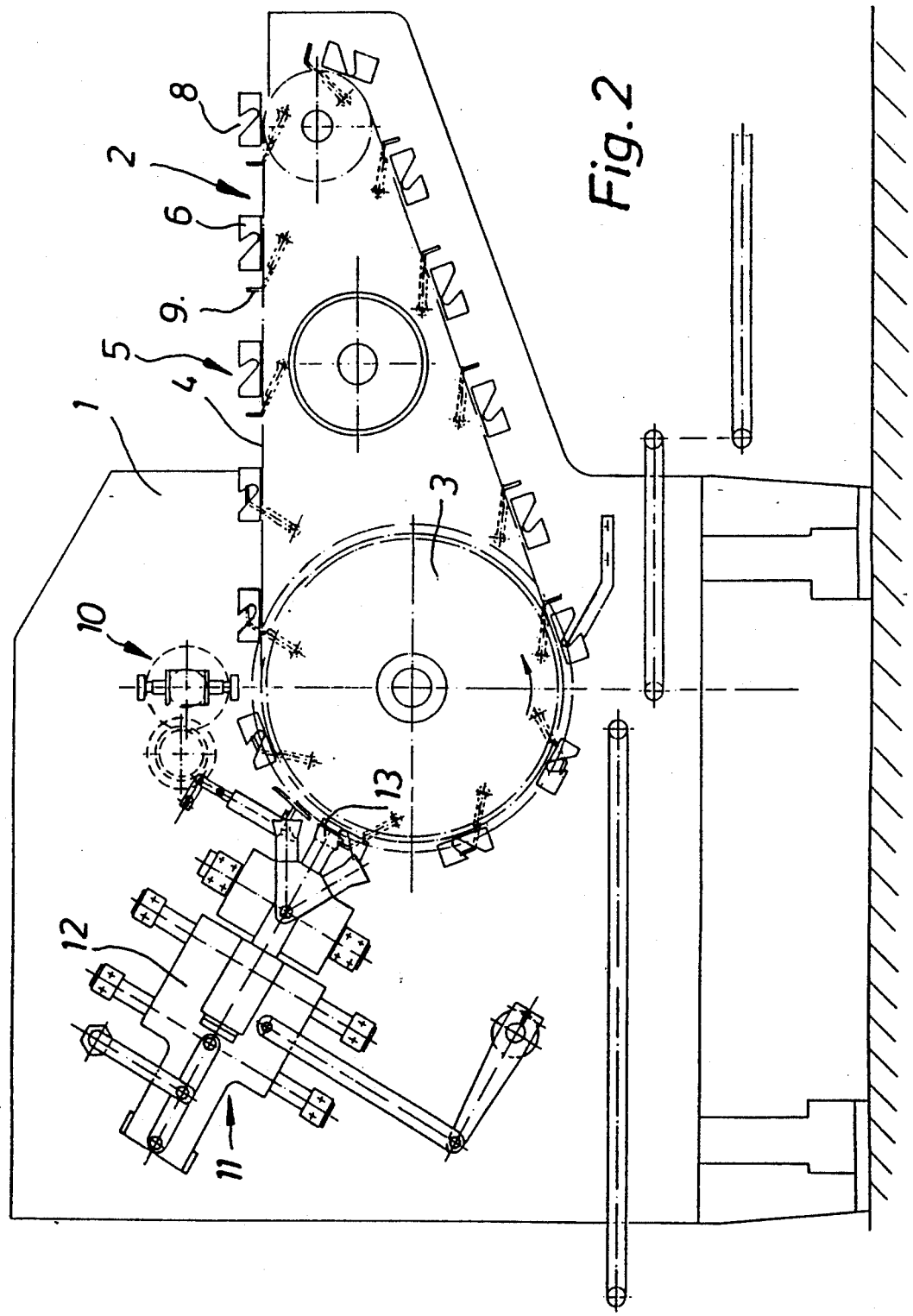

METHOD FOR DEBONING POULTRY LEGS AND APPARATUS FOR PERFORMING THE METHOD

BACKGROUND OF THE INVENTION

1. Field of the Invention

The invention relates to a method for processing poultry legs for the purpose of gaining the meat therefrom, by which method the tendons and ligaments extending along the drumstick (lower leg bone) are severed at the distal end area thereof and subsequently the meat is stripped off by a relative movement between the bone and the meat, which relative movement is directed towards the proximal end of said bone, and to an apparatus for performing the method and comprising pincer- or tong-shaped gripping means for gripping the leg in the region of its distal condyle and holding means for embracing said condyle, when seen in the proximal direction, close to the tong-shaped gripping means, which holding means are arranged to be displaced in the longitudinal direction of said bone such as to reduce the distance relative to said gripping means, as well as severing device for severing the tendons and ligaments adjacent to the gripping position of said gripping means.

For deboning poultry legs by means of pulling the leg bone it is important that a visually attractive piece of leg meat is obtained with high yield. Thereby, visual quality is even more easily achievable when the meat is subjected to less wear and tear. The degree of wear is dependent upon the extent to which the tendency to pull the meat portions out along with the leg bone due to their adherence thereto can be reduced or prevented, i.e. to prevent the meat parts from being torn out of the leg meat.

2. Prior Art

It is known that this tendency can be diminished if the tendons and ligaments running through the said meat parts are severed in the distal end region of the leg bone prior to removal of the bone. This takes place e.g. according to DE 32 27 430 C2 when a poultry leg which has been fitted into or clamped by a bone gripping apparatus by means of gripping the leg bone on the distal end thereof is provided with a circumferential notch immediately next to the clamping position by means of a notching apparatus, the production of said circumferential notch causing the tendons and ligaments extending in this region to be severed. Then, by means of an embracing support cheek arrangement located in the proximal direction of the poultry leg adjacent to the circumferential notch, the leg meat is held back and, through removal of the bone gripping apparatus from the support cheek arrangement in the longitudinal direction of the leg bone, the meat is stripped off.

If the poultry legs to be processed concern the drumstick (lower leg), then this manner of proceeding shows that the splint bone forming a needle-shaped bone extending in the distal direction is loosened from the leg bone along with the leg meat relatively often, i.e. it remains in the leg meat. As a result, additional trim work is necessary and, consequently, such processing is also inacceptable from a cost standpoint.

An apparatus for processing poultry extremities containing bones is known from EP 402 647. The starting workpiece is the knee-joint including the whole leg consisting of the thigh (upper leg) and drumstick (lower leg). With this apparatus, the drumstick is retained on its distal end and the thigh is retained on its proximal end through placement in holding elements provided with receiving slots; an incision is produced around the drumstick bone in the vicinity of the clamping position of the said distal end, the knee joint is punched out and, finally, the bones are pulled out by embracing the condyle under retention of the meat.

With this apparatus also, it cannot be ensured that the splint bone is removed from the meat along with the drumstick bone.

Objects of the Invention

The main object of the present invention is to suggest a method and an apparatus overcoming the above described advantages of the prior art. It is an essential object of the present invention to enable and safeguard the deboning of poultry drumsticks in such a manner that a bone-free leg meat product results.

It is a further important object of the invention to enable the gaining of qualitatively appealing pieces. When high yield.

SUMMARY OF THE INVENTION

In a method for processing poultry legs in the form of at least one of whole legs and drumsticks for the purpose of gaining the meat therefrom, these objects are achieved by the steps of severing the tendons and ligaments extending along the drumstick bone at the distal end area thereof, with this severing cut being performed without severing the tendon which forms a continuation of the splint bone (fibula) in the distal direction, and subsequently stripping off the meat by a relative movement between the bone and the meat, which relative movement is directed towards the proximal end of said drumstick bone. For this purpose, it is advantageous to proceed such that the tendons and ligaments to be severed are collected on one side of the drumstick bone and subsequently cut through.

For carrying out this method, an apparatus is suitable which comprises tong-shaped gripping means for gripping the leg bone in the region of its distal condyle; holding means for embracing the condyle in a proximal direction close to the gripping means, which holding means are arranged to be displaced in the longitudinal direction of the drumstick bone such as to reduce the distance relative to the gripping means; and severing means for severing the tendons and ligaments adjacent to the gripping position of the gripping means, wherein the characterising features consist of tong-shaped gripping means having two gripping elements for gripping the leg bone, the recesses of which gripping elements extend essentially perpendicularly to the plane in which the gripping elements move; and a cutting mechanism mounted directly on the tong-shaped gripping means. A preferred cutting mechanism is suggested to be designed as a knife blade provided with a front cutting edge, which blade is arranged to be advanced immediately close to the bone held in the holding means and essentially transversally thereto such that the front cutting edge crosses the path of the bone.

In order to prevent the tendons and ligaments to be severed from being urged out of the cutting region of the knife blade during the cutting step, the front cutting edge thereof can be designed in a skewed manner such that its point in the region nearest the drumstick bone is leading.

A particularly simple and expedient embodiment is obtained if the severing device is integrated into the tong-shaped gripping means for gripping the leg bone, i.e. if one of the gripping elements is provided with a guide slot for the knife blade immediately bordering on its recess, and the other gripping element is provided with a penetration slot for the knife blade.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows an axonometric representation of a receptacle for poultry legs to be processed;

FIG. 2 shows, by way of a simplified representation, a side view of an apparatus industrially utilized;

FIG. 3a shows a side view of the apparatus according to the invention with a poultry leg fixed in an indicated holding element of a stripping-off mechanism and an opened severing device for cutting through the tendons and ligaments;

FIG. 3b shows a side view of the apparatus according to FIG. 3a;

FIG. 4a a shows a side view of the apparatus according to FIG. 3a with the severing device closed about the drumstick bone;

FIG. 4b shows a side view of the apparatus according to FIG. 4a;

FIG. 5a shows a side view of the apparatus according to FIG. 3a with the severing device in operation;

FIG. 5b shows a side view of the apparatus according to FIG. 5a.

DETAILED DESCRIPTION OF THE PREFERRED EMBODIMENTS

The apparatus according to the invention is preferably constructed to form a processing station in combination with an apparatus for deboning as disclosed by EP 402 447. As shown in FIG. 2 of the present drawings, the apparatus according to the invention is arranged on a portal-shaped frame 1 whose portal half facing the viewer has been removed for reasons of better and easier viewing of the arrangement of the processing tools. These are installed essentially in the region of the periphery of a deflection wheel 3 of a conveyor 2, the latter including two endless conveyor belts for running parallel to each other and being driven to revolve synchronously. The conveyor 2 is equipped with holding devices 5, which are arranged at even pitch. Each holding device comprises two holding elements 6, which oppose each other in a mirror-like manner leaving a space 7 between them. This results from the left and right holding elements 6, respectively, being associated with a corresponding one of the conveyor belts 4. Each holding element 6 is formed as a support web and has an opening 8 being shaped as an open recess for holding legs 40 to be processed in the area of the their condyles 41, 42 lying at the outer sides.

The arrangement of the holding elements 6 is such that the leg 40 lying in the openings 8 is conveyed transversally to its longitudinal axis. Associated to each holding device 5 is a holding-down means 9, which can be controlled appropriately during the conveying that the leg 40 is held down in the holding elements 6. Prepared in this manner, the legs pass an aligning member 10, which brings the central joint 43 into a position which enables the following punching-out of said joint. For this purpose, a punching device 11 including a hollow die 13 and mounted to a carriage 12 is provided, which device is controlled via a not-shown cam drive to carry out an accompanying movement in synchronism with the advancing speed of the conveyor 2 over a certain distance. The punching step is performed during the co-movement of the carriage 12 with a holding device 5 by moving the hollow die 13 against the conveyor 2.

In the region of the deflection wheel 3 the holding elements 6 are each associated with devices 14 for pulling or extracting the lower and upper leg bones 44 and 45, respectively. These devices accompany the holding devices 5 during the revolution thereof about the deflection wheel 3 whilst being controlled appropriately. The following description of such a device 14 relates to a device of the type which laterally opposes the holding element 6 holding the leg 40 in the region of its distal end. Each of these devices 14 comprises according to FIGS. 3, 4 and 5 a combined tool, consisting of tongs 15 and a severing device 16 with a cutting mechanism. The tongs 15 are formed by a pair of gripping elements 17 and 18, which are mounted on a pusher member 19 to pivot synchronously in opposite directions, said pusher member being suitably, preferably via cam control, movable in the direction of the longitudinal axis of the legs 40 to be processed. The actuation and driving of the gripping elements 17 and 18 can take place via cam control as well and, like the drive of the pusher member 19, does not appear in detailed representation. The gripping elements 17 and 18 have one recess 20 each in their parts surrounding the leg bone 44, each of which recesses has respectively essentially the shape of half of the cross-section of the leg bone 44 in the region of its distal end. In the opening position of the gripping elements 17 and 18, as can be taken from FIG. 3b, the recesses 20, relative to the position of the leg bones 44 determined by the arrangement of the opening 8 in the associated holding element 6, are aligned laterally displaced by approximately one-third of the thickness dimension of said leg bones at the portion thereof to be gripped.

The severing device 16 comprises according to FIGS. 3, 4 and 5, a knife blade 21, which is guided in a guide slot 22 in the gripping element 18. The guide slot 22 borders directly on the recess 20 in the gripping element 18. The knife blade 21 has a skewed front cutting edge 23 and is inserted in the guide slot 22 such that a leading tip results immediately next to the recess 20. The knife blade 21 is held in an inoperative position by means of a spring mechanism 24, in which position the front cutting edge 23 is placed completely within the gripping element 18. The other gripping element 17 has a penetration slot 25 for the knife blade 21, said slot lying flush with the guide slot 22, in the closed position of the gripping elements 17 and 18. The operation of the knife blade 21 takes place through a control cam 26, which is arranged stationarily next to the deflection wheel 3 and engaged by a tappet 27, which communicates with the knife blade 21, during the progress of conveyance.

The function of the apparatus is described in the following in context with a processing cycle on a leg 40 to be removed:

The leg 40 to be processed is positioned through guiding its distal and proximal end portions into the openings 8 of both holding elements 6 of a holding device 5 such that the condyles 41 and 42 project laterally beyond the holding elements 6 and the bending plane of the leg 40 extends essentially parallelly to the direction of conveyance with the central joint 43 leading. During the conveyance, the leg 40 is first held down via one of the holding-down devices 9 overlapping it, then aligned relative to the position of its central joint 43 by means of an aligning member and supplied, fixed in this position through follow-up control of the holding-down means 9, to the punching device 11, which punches the central joint 43 out by means of its hollow die 13. During the revolution of the holding device 5 around the periphery of the deflection wheel 3, the holding device 5 is laterally met and accompanied by devices 14 for pulling the leg bones 44 and 45. The device associated with the distal end of the leg 40 is pursued further in the following. During conveying progress, the gripping elements 17 and 18 of this device 14 are brought into a position to grip the condyle 41 projecting out of the holding element 6, by which the access portion is located immediately next to the holding element 6. Due to the alignment of the recesses 20 of the gripping elements 17 and 18 being displaced in relation to the position of the leg 40, during the closing step of the gripping elements 17 and 18 the leg bone 44 is forced into the recesses 20, by which step the meat parts and tendons 48 surrounding the trailing side of the leg bone 44 are urged into the severing gap between the gripping elements 17 and 18. In this holding condition, the knife blade 21 which has been guided in the gripping element 18 reaches with its tappet 27 the region of a control cam 26, which advances the knife blade 21 in its guide slot 22 against the spring mechanism 24. During this action, the front cutting edge 23 of said knife blade crosses the severing gap between the gripping elements 17 and 18 and penetrates into the penetration slot 25 in the gripping element 17. At the same time, the tendons 48 as well as the skins and ligaments which have gathered on the trailing side of the leg bone 44 are severed, the obliqueness of the front cutting edge 23 effecting that a drawing cut is produced in a direction away from the leg bone 44. Thereafter, the tongs 15 formed by the gripping elements 17 and 18 are moved in closed condition while increasing the distance to the associated holding elements 6 and consequently pulling the leg bone 44 out of the leg meat, which, due to the diaphragm effect of the opening 8 in the holding element 6 is held back. During this process, the tendon 47 of the fibula or splint bone 46 which tendon has not been damaged effects that the splint bone 46 is removed from the leg meat together with the leg bone 44.

What is claimed is:

1. A method for processing poultry legs in the form of at least one of whole legs and drumsticks comprising at least one bone, a splint bone (fibula), tendons and ligaments, and meat, and defining a distal and a proximal end, for the purpose of gaining the meat therefrom, the method comprising the steps of
   a) severing the tendons and ligaments extending along the drumstick bone at said distal end area thereof and
   b) subsequently stripping off the meat by a relative movement between said bone and said meat, which relative movement is directed towards said proximal end of said drumstick bone, wherein
   said severing step is performed without severing a tendon which forms a continuation of said splint bone in the direction, towards said distal end.

2. A method as claimed in claim 1, wherein prior to their being severed the tendons and ligaments are collected on one side of said drumstick bone and severed following such concentration.

3. An apparatus for processing poultry legs in the form of at least one of whole legs and drumsticks comprising at least one bone, a splint bone (fibula), tendons and ligaments, and meat, and defining a distal and a proximal end, for the purpose of gaining the meat therefrom by severing said tendons and ligaments extending along said drumstick bone at said distal end area thereof and subsequently stripping off the meat by a relative movement between said bone and the meat, which relative movement is directed towards said proximal end of said drumstick bone, which apparatus comprises
   a) tong-shaped gripping means for griping said drumstick bone in the region of its distal condyle and defining a gripping movement plane;
   b) holding means for embracing said condyle in a proximal direction close to said gripping means, which holding means are arranged to be displaced in the longitudinal direction of said drumstick bone such as to reduce the distance relative to said gripping means; and
   c) severing means for severing said tendons and ligaments adjacent to the gripping position of said gripping means,
wherein
   d) said gripping means comprises gripping elements which are provided with recesses for holding said drumstick bone and arranged to extend essentially perpendicular to said gripping-movement plane, and
   e) said severing means comprises a cutting mechanism arranged immediately on said gripping means.

4. An apparatus as claimed in claim 3, wherein said cutting mechanism of said severing means comprises a knife blade which is provided with a front cutting edge and arranged to be advanced immediately close to the drumstick bone held in said holding means and essentially transversally thereto such that said front cutting edge crosses the path of the drumstick bone.

5. An apparatus as claimed in claim 3, wherein said front cutting edge of said knife blade is designed in a skewed manner such that its point in the region closest to said drumstick bone is leading.

6. An apparatus as claimed in claim 4, wherein said front cutting edge of said knife blade is designed in a skewed manner such that its point in the region closest to said drumstick bone is leading.

7. An apparatus as claimed in claim 3, wherein said severing means is integrated into said gripping means with one of said gripping elements being provided with a guide slot for said knife blade immediately adjacent to said recess thereof, while another one of said gripping elements is provided with a penetration slot for said knife blade.

8. An apparatus as claimed in claim 4, wherein said severing means is integrated into said gripping means with one of said gripping elements being provided with a guide slot for said knife blade immediately adjacent to said recess thereof, while another one of said gripping elements is provided with a penetration slot for said knife blade.

9. An apparatus as claimed in claim 5, wherein said severing means is integrated into said gripping means with one of said gripping elements being provided with a guide slot for said knife blade immediately adjacent to said recess thereof, while another one of said gripping elements is provided with a penetration slot for said knife blade.

10. An apparatus as claimed in claim 6, wherein said severing means is integrated into said gripping means with one of said gripping elements being provided with a guide slot for said knife blade immediately adjacent to said recess thereof, while another one of said gripping elements is provided with a penetration slot for said knife blade.

* * * * *